(12) United States Patent
Li et al.

(10) Patent No.: US 12,226,726 B2
(45) Date of Patent: Feb. 18, 2025

(54) CONFORMABLE PLEATED AIR FILTER WITH BRIDGING FILAMENTS

(71) Applicant: 3M INNOVATIVE PROPERTIES COMPANY, St. Paul, MN (US)

(72) Inventors: Changwen Li, Shanghai (CN); Andrew R. Fox, Oakdale, MN (US); Bryan L. Gerhardt, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 18/229,021

(22) Filed: Aug. 1, 2023

(65) Prior Publication Data

US 2023/0372854 A1 Nov. 23, 2023

Related U.S. Application Data

(63) Continuation of application No. 15/547,182, filed as application No. PCT/CN2015/000064 on Jan. 29, 2015, now abandoned.

(51) Int. Cl.
*B01D 46/10* (2006.01)
*B01D 46/16* (2006.01)
*B01D 46/52* (2006.01)

(52) U.S. Cl.
CPC ........... *B01D 46/103* (2013.01); *B01D 46/10* (2013.01); *B01D 46/16* (2013.01); *B01D 46/523* (2013.01); *B01D 2275/203* (2013.01)

(58) Field of Classification Search
None
See application file for complete search history.

(56) References Cited

U.S. PATENT DOCUMENTS

| | | |
|---|---|---|
| RE30,782 E | 10/1981 | Van Turnhout |
| 4,813,948 A | 3/1989 | Insley |
| 5,230,800 A | 7/1993 | Nelson |
| 5,256,231 A | 10/1993 | Gorman et al. |
| 5,620,545 A | 4/1997 | Braun et al. |
| 5,681,302 A | 10/1997 | Melbye et al. |
| 5,804,295 A | 9/1998 | Braun et al. |
| 6,521,011 B1 | 2/2003 | Sundet et al. |
| 6,758,878 B2 | 7/2004 | Choi et al. |
| 6,814,660 B1 * | 11/2004 | Cavett .................... B01D 46/10 454/284 |
| 6,843,820 B2 | 1/2005 | Kubokawa |
| 6,860,916 B2 | 3/2005 | Kubokawa et al. |
| 6,955,702 B2 | 10/2005 | Kubokawa et al. |
| 6,986,804 B2 | 1/2006 | Dominiak et al. |

(Continued)

FOREIGN PATENT DOCUMENTS

| | | |
|---|---|---|
| CN | 2230411 Y | 7/1996 |
| CN | 2394147 Y | 8/2000 |

(Continued)

OTHER PUBLICATIONS

1507 Extended European Search Report for EP15879292.9, PCT/CN2015/000064, Date Aug. 3, 2018, 7 pages.

(Continued)

*Primary Examiner* — Brit E. Anbacht
(74) *Attorney, Agent, or Firm* — Kenneth B. Wood

(57) ABSTRACT

A conformable, unframed pleated air filter, comprising a plurality of bridging filaments on at least one face of the pleated air filter.

20 Claims, 4 Drawing Sheets

(56) References Cited

U.S. PATENT DOCUMENTS

| | | | |
|---|---|---|---|
| 7,052,565 | B2 | 5/2006 | Seth |
| 7,235,115 | B2 | 6/2007 | Duffy et al. |
| 7,255,723 | B2 | 8/2007 | Choi et al. |
| 7,896,940 | B2 | 3/2011 | Sundet et al. |
| 7,947,142 | B2 | 5/2011 | Fox et al. |
| 8,157,938 | B2 | 4/2012 | Eisengräber-Pabst et al. |
| 8,162,153 | B2 | 4/2012 | Fox et al. |
| 8,231,700 | B2 | 7/2012 | Sundet |
| 8,506,667 | B2 | 8/2013 | Nikolin et al. |
| 8,685,129 | B2 | 4/2014 | Lise |
| 8,702,829 | B2 | 4/2014 | Lise et al. |
| D725,390 | S | 3/2015 | Sanocki et al. |
| D732,153 | S | 6/2015 | Sanocki et al. |
| 9,174,159 | B2 | 11/2015 | Sanocki et al. |
| 9,278,301 | B2 | 3/2016 | Fox et al. |
| 9,320,998 | B2 * | 4/2016 | Gillilan .............. B01D 46/0016 |
| 2004/0011204 | A1 | 1/2004 | Both |
| 2005/0204714 | A1 | 9/2005 | Sundet et al. |
| 2005/0217226 | A1 | 10/2005 | Sundet et al. |
| 2008/0038976 | A1 | 2/2008 | Berrigan et al. |
| 2008/0115475 | A1 | 5/2008 | Sandberg |
| 2009/0019824 | A1 | 1/2009 | Lawrence |
| 2013/0101477 | A1 | 4/2013 | Both et al. |
| 2013/0205732 | A1 | 8/2013 | Gillilan |
| 2014/0165517 | A1 | 6/2014 | Hara et al. |
| 2014/0230385 | A1 | 8/2014 | Schuld et al. |
| 2015/0267927 | A1 | 9/2015 | Zhang et al. |
| 2017/0182445 | A1 | 6/2017 | Zhang et al. |
| 2017/0216756 | A1 | 8/2017 | Fox et al. |
| 2018/0021716 | A1 * | 1/2018 | Li ....................... B01D 46/103 55/497 |
| 2020/0129907 | A1 | 4/2020 | Fox et al. |

FOREIGN PATENT DOCUMENTS

| | | |
|---|---|---|
| CN | 2497215 Y | 6/2002 |
| CN | 201551913 U | 8/2010 |
| CN | 101232929 B | 4/2011 |
| CN | 102580377 A | 7/2012 |
| CN | 1679994 B | 10/2013 |
| CN | 103764251 B | 7/2015 |
| JP | 09502124 A | 3/1997 |
| JP | 2005088805 A | 4/2005 |
| JP | 5919516 B2 | 5/2016 |
| WO | 199505235 A1 | 2/1995 |
| WO | 2005102497 A1 | 11/2005 |
| WO | 2010151542 A2 | 12/2010 |
| WO | 2015090870 A1 | 6/2015 |
| WO | 2015112656 A1 | 7/2015 |

OTHER PUBLICATIONS

International Search Report for PCT International Application No. PCT/CN2015/000064, mailed on Oct. 9, 2015, 5 pages.

\* cited by examiner

CONFORMABLE PLEATED AIR FILTER WITH BRIDGING FILAMENTS

This application is a continuation of U.S. patent application Ser. No. 15/547,182, which was a national stage filing under 35 U.S.C. 371 of PCT Application No. CN2015/000064 (published as International Publication No. WO2016/119080), the disclosures of both of which are incorporated by reference in their entirety herein.

BACKGROUND

Pleated filters are commonly used in air filtration applications, e. g. in heating-ventilating-air conditioning (HVAC) systems.

SUMMARY

Herein is disclosed a conformable, unframed pleated air filter, comprising a plurality of bridging filaments on at least one face of the pleated air filter. These and other aspects of the invention will be apparent from the detailed description below. In no event, however, should this broad summary be construed to limit the claimable subject matter, whether such subject matter is presented in claims in the application as initially filed or in claims that are amended or otherwise presented in prosecution.

Figure 1:
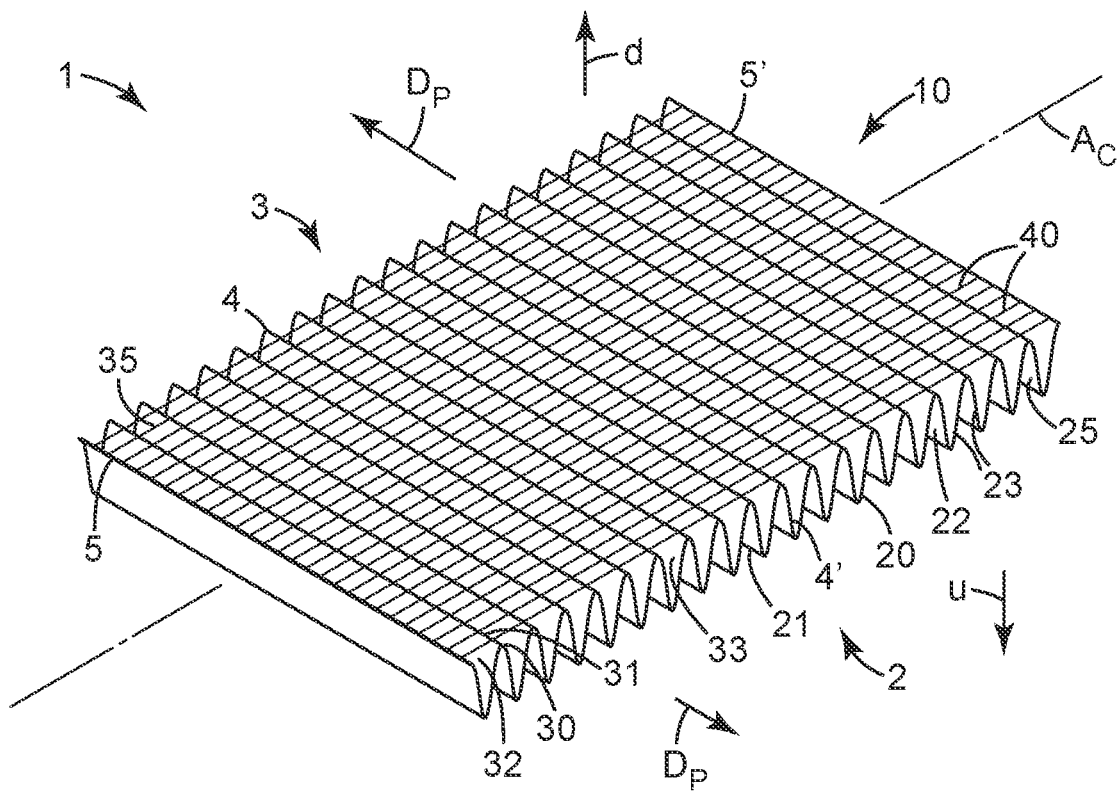
FIG. 1 is a side-downstream perspective view of an exemplary conformable, unframed, non-self-supporting pleated air filter, in a nominally planar configuration.

Like reference symbols in the various figures indicate like elements. Unless otherwise indicated, all figures and drawings in this document are not to scale and are chosen for the purpose of illustrating different embodiments of the invention. In particular the dimensions of the various components are depicted in illustrative terms only, and no relationship between the dimensions of the various components should be inferred from the drawings, unless so indicated.

Definitions

Although terms such as "top", bottom", "upper", lower", "under", "over", "front", "back", "up" and "down", and "first" and "second" may be used in this disclosure, it should be understood that those terms are used in their relative sense only unless otherwise noted. As used herein as a modifier to a property, attribute or relationship, the term "generally", unless otherwise specifically defined, means that the property, attribute or relationship would be readily recognizable by a person of ordinary skill but without requiring absolute precision or a perfect match (e.g., within +/−20% for quantifiable properties); the term "substantially" means to a high degree of approximation (e.g., within +/−10% for quantifiable properties) but again without requiring absolute precision or a perfect match. The term "essentially" means to a very high degree of approximation (e.g., within plus or minus 2% for quantifiable properties; it will be understood that the phrase "at least essentially" subsumes the specific case of an "exact" match. However, even an "exact" match, or any other characterization using terms such as e.g. same, equal, identical, uniform, constant, and the like, will be understood to be within the usual tolerances or measuring error applicable to the particular circumstance rather than requiring absolute precision or a perfect match. All references herein to numerical parameters (dimensions, ratios, and so on) are understood to be calculable (unless otherwise noted) by the use of average values derived from a number of measurements of the parameter.

Terms such as "outer", "outward", "outwardmost", "outwardly", and the like, mean in a direction away from the geometric center of a pleated air filter, at least generally along the major plane of the air filter when the filter is in a nominally planar configuration as discussed in detail later herein. Terms such as "inner", "inward", "inwardmost", "inwardly", and the like, mean in a direction generally toward the geometric center of the pleated air filter.

The term "upstream" is used to denote the side of the air filter from which moving air (e.g. in an HVAC system) impinges on the filter media. The term "downstream" is used to denote the side of an air filter through which air exits the filter media (e.g. the side that abuts, e.g. contacts, a filter-support layer of an HVAC system, as discussed later herein). Pleated filters are often marked (or otherwise designated) by the manufacturer to identify upstream and downstream sides in order that the filter be installed in the proper orientation in an HVAC system; thus, the terms upstream and downstream can serve to differentiate the two sides of a pleated filter even if the filter has not yet been positioned in an HVAC system. Various Figures are marked with "u" and "d" arrows to aid in recognition of upstream and downstream sides of the exemplary pleated air filters disclosed herein.

The term "non-self-supporting" denotes a pleated air filter that, in the absence of a filter-support layer, is not capable of withstanding the forces encountered due to forced-air flow in an HVAC system, as discussed later herein in detail.

Figure 2:
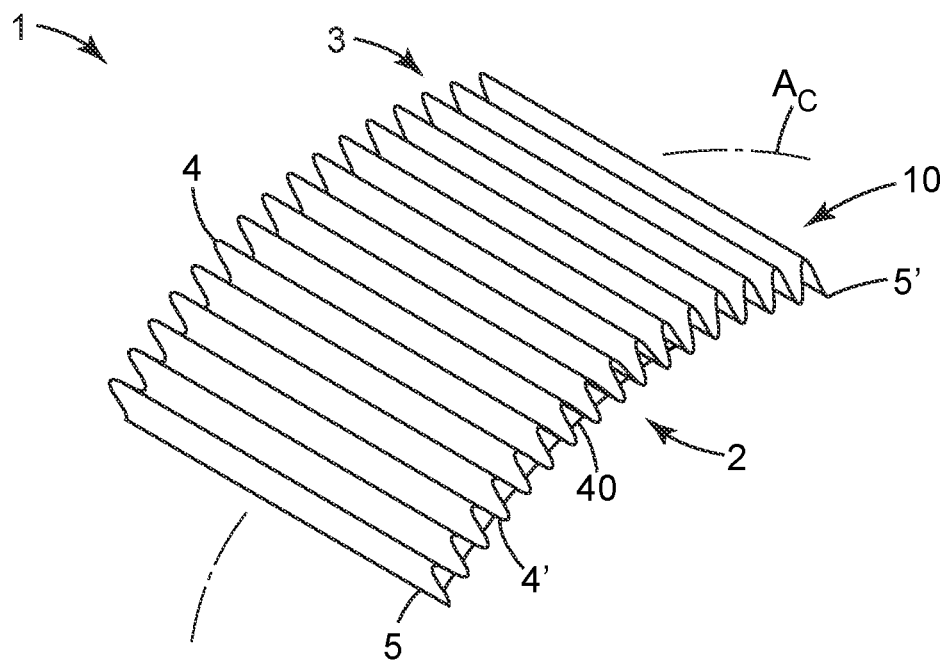
FIG. 2 is a side-upstream perspective view of the exemplary pleated air filter of FIG. 1, conformed into an arcuate configuration.

The term "conformable" denotes a pleated air filter that is able to be conformed between at least a nominally planar configuration (such as shown in FIG. 1) and an arcuate configuration (such as shown in FIG. 2). (The term "nominally" planar configuration is used in view of the fact that a pleated air filter in a configuration such as that shown in FIG. 1 exhibits a readily recognizable overall major plane, in spite of the presence of pleats that locally deviate from the overall major plane.)

The term "unframed" denotes a pleated air filter that does not comprise a rigidifying perimeter support frame (e.g., a channel frame, a pinch frame, and so on), as are commonly used with conventional pleated air filters and are often made of e.g. cardboard, molded plastic channel members, etc., on major edges of the pleated air filter.

DETAILED DESCRIPTION

Shown in FIGS. 1 and 2 in perspective view is an exemplary conformable, unframed, non-self-supporting pleated air filter 1 comprising conformable, unframed, non-self-supporting, pleated air filter media 10. In some embodiments pleated air filter 1 may be rectangular in shape (which specifically includes square shapes) with e.g. four corners; in such embodiments pleated filter media 10 may thus have a generally rectangular perimeter (which does not preclude irregularities, notches, chamfered or angled corners, or the like, in the perimeter of filter media 10). Pleated filter 1 exhibits major ends and edges, e.g. four major edges as shown in FIG. 1. For convenience, major ends/edges 4 and 4' (which terminate as exposed pleats) will be referred to as corrugated edges, and major ends/edges 5 and 5' will be referred to as noncorrugated edges.

Pleated air filter 1 comprises an upstream side 2 and a downstream side 3; pleated filter media thus comprises an upstream face 25 and a downstream face 35. As shown in FIG. 1, pleated filter media 10 comprises a plurality of upstream pleats 20, oriented in generally parallel relation to each other. Each upstream pleat 20 comprises an upstream pleat tip 21 and each adjacent pair of upstream pleats 20 defines an upstream pleat valley 22 therebetween. Flowing air passes into upstream valley 22 and into upstream pleat walls 23 so as to penetrate into pleated filter media 10. Pleated filter media 10 further comprises a plurality of downstream pleats 30, in generally parallel relation to each other and in oppositely-facing configuration from upstream pleats 20. Each downstream pleat 30 comprises a downstream pleat tip 31 and each adjacent pair of downstream pleats 30 defines a downstream pleat valley 32 therebetween. Flowing air passes out of downstream pleat walls 33 to exit pleated filter media 10.

Conformable

Pleated air filter media 10 is conformable; moreover, no rigidifying perimeter support frame being present, pleated air filter 1 is likewise conformable. By this is meant that pleated air filter 1 can be conformed (curved) at least between a first, nominally planar configuration as described herein (and as depicted in FIG. 1) into a second, conformed configuration that is an arcuate configuration (as depicted in FIG. 2). The conformability is reversible and repeatable and can be performed manually by a user of filter 1, without the need for any special tools. The pleated media is conformed along a conforming "axis" $A_c$ that follows the major plane of the pleated media when in the nominally planar condition (as shown in FIG. 1), and that follows the arcuate shape of the pleated media when it is conformed into the second, conformed configuration (as shown in FIG. 2). The conforming axis $A_c$ will be at least generally, substantially, or essentially orthogonal to the pleat direction $D_p$ (and will typically be orthogonal to the overall upstream-downstream direction of airflow through the pleated filter). This can provide that when the pleated filter is conformed, similar or the same curvature is present along the entire length of each pleat (i.e., across the width of filter 1), as in the exemplary depiction of FIG. 2. This can minimize the chance of any wrinkling or crumpling of the pleated media due to the conforming.

Bridging filaments 40 are arranged and composed to allow the desired conforming. Moreover, the pleated media 10 is configured (e.g. in terms of the stiffness of the media and/or the pleat distance and/or spacing) to allow the desired conforming. In some embodiments the pleated media 10 may be sufficiently flexible that the conforming is achieved at least partly by way of the media bending between the pleats, as opposed to bending only at the pleats. It will be appreciated that at least portions of bridging filaments 40 may bend slightly due to the conforming, and that in the conformed configuration the downstream pleat tips will be at least slightly closer to each other than will the upstream pleat tips.

The second, conformed configuration of pleated filter 1 (as shown e.g. in FIG. 2) may be conveniently characterized by way of the average radius of curvature of conforming axis $A_c$. When pleated filter 1 is in the first, nominally planar configuration, the average radius of curvature will approach infinity. In the second, conformed configuration, the average radius of curvature of conforming axis $A_c$ will be less than about 100 cm. In specific embodiments, in the second, conformed configuration the average radius of curvature of conforming axis $A_c$ will be less than about 50, 40, 30, 25, 20, 15, or 10 cm. In further embodiments, in the second, conformed configuration the average radius of curvature of conforming axis $A_c$ will be at least about 4, 6, 8, 10, 15, 20, or 25 cm.

The average radius of curvature is taken along the length (along axis $A_c$ of the area of pleated filter media 10 through which air flows (e.g., disregarding any portion of the pleated filter media that e.g. may be covered by a hook strip, may be wrapped around the backside of a filter-support layer of an HVAC system in order to install the filter on the filter-support layer, and so on). The average is used in view of the fact that the radius of curvature may vary along axis $A_c$. In some embodiments the radius of curvature may be at least generally, substantially, or essentially constant along axis $A_c$ (ignoring the local variations due to the pleats). In other embodiments, the radius of curvature may vary along axis $A_c$. For example, pleated filter 1 may be conformed into a shape with a relatively flat area (e.g., proximate one major noncorrugated end of the pleated filter) and with a more sharply curved area proximate the other major noncorrugated end of the pleated filter. In further embodiments, pleated filter 1 may be conformed into a shape with relatively flat areas proximate both major noncorrugated ends of the pleated filter and with a more sharply curved area between the two relatively flat areas (or vice versa). As will be discussed later in detail, such conforming may be performed so as to conform pleated filter 1 into a shape that matches that of an arcuate filter-support layer (of an HVAC system) on which the pleated filter is installed.

Regardless of the complexity with which pleated filter 1 is curved along axis $A_c$, in at least some embodiments pleated filter 1, when in the second, conformed configuration, exhibits a shape with single curvature (with the curvature being orthogonal to the pleat direction). Such a configuration will be contrasted with a shape that exhibits compound curvature (such as e.g. a section of a sphere, paraboloid or hyperboloid). This can minimize the chance of any wrinkling or crumpling of the pleated media due to the conforming. It will be appreciated that such single-curvature embodiments will be distinguished from filters (in e.g. respirator masks) that are formed into complex, compound-curvature shapes so as to conform to e.g. a human face.

Flowing air will locally approach pleated filter 1, and will locally leave pleated filter 1, along a direction that is at least generally orthogonal to the pleat direction $D_p$. That is, in ordinary use of pleated filter 1, there may be little or no airflow along the long axis of the valleys of the pleated media. In particular, pleated filter 1 is distinguished from arrangements in which a fluid flows along the valleys in between multiple layers (e.g., stacks or wraps) of pleated media. Thus in at least some embodiments, pleated filter 1 will consist essentially of a single layer of pleated media 10 (although pleated media 10 itself may be a multilayer material). Furthermore, by definition pleated filter 1, as provided to an end user, is capable of being conformed between an arcuate configuration and a nominally planar configuration (as described above) rather than e.g. being permanently held in an arcuate configuration e.g. by a frame or housing. Conformable pleated filter 1 is thus distinguished from e.g. so-called cartridge filters and the like that, as supplied, comprise one or more layers of filter media held permanently in an arcuate configuration. Still further, conformable pleated filter 1 is distinguished from e.g. so-called pleated filter inserts that are provided in an accordionized (folded together) condition (e.g. for ease of packaging and shipping) and that are configured to be expanded into a nominally planar configuration e.g. to be fitted into a frame.

Bridging Filaments

Non-self-supporting pleated air filter 1 comprises a plurality of bridging filaments 40 on at least one face of pleated filter media 10. In some embodiments, bridging filaments 40 may be only on downstream face 35 of pleated filter media 10 (as shown in exemplary embodiment in FIGS. 1 and 2). In some embodiments, bridging filaments 40 may be only on upstream face 25 of pleated filter media 10. At least portions of at least some of the bridging filaments 40 are bonded to at least portions of at least some of the pleat tips (of whichever face of pleated filter media 10 the bridging filaments are provided on) and can help maintain the pleat spacing of pleated filter media 10 as discussed later herein. By definition, a bridging filament is not pleated along with pleated filter media 10. Also by definition, a bridging filament is one that extends between, and is bonded to, at least two same-side (e.g., downstream) pleat tips of pleated filter media 10; or, that is bonded to and/or entangled with other filaments so that the filaments collectively bridge the distance between at least two same-side pleat tips of pleated filter media 10 (with at least some of the filament portions that are in contact with the pleat tips being bonded to the pleat tips). That is, in some exemplary embodiments bridging filaments might be collectively supplied by e.g. filaments of a spun-bonded web (scrim), which filaments, even if they are too short and/or are oriented so that they do not extend between pleat tips, are bonded to other filaments so as to collectively bridge the distance between the pleat tips. In at least some embodiments, however, bridging filaments 40 will comprise an average length that is at least 100%, 200%, 400%, or 800% of the spacing between consecutive same-side pleat tips, and/or will be arranged so that at least some individual filaments extend between, and are bonded to, at least two pleat tips of pleated filter media 10.

Not being pleated (and being in discontinuous contact with a face of pleated filter media 10), bridging filaments 40 will often collectively comprise an at least generally planar configuration when pleated filter 1 is in a nominally planar configuration (as shown in exemplary embodiment in FIG. 1). This characterization is used for convenience; filaments 40 do not necessarily have to form a perfectly flat plane (e.g., some slight sagging of portions of filaments 40 into pleat valleys may occur). Regardless of how closely the filaments approach a true plane, most portions of most filaments 40 are spaced away from the majority of the area of the pleat walls 33; that is, they are spaced apart from all such pleat wall areas except those at, or very close to, the pleat tips.

Bridging filaments may be provided on a face of pleated filter media 10 in any suitable manner and in any suitable arrangement. In embodiments of the general type shown in FIG. 1, at least some bridging filaments 40 may be at least generally, substantially, or essentially aligned with the conforming axis $A_c$ of pleated filter media 10. The latter of these is illustrated in FIGS. 1 and 2. In such cases, the bridging filaments may be oriented at least generally orthogonal to (e.g., within +/− about 5 degrees of 90 degrees to) the pleat direction of pleated filter media 10 (with pleat direction $D_p$ meaning a direction parallel to pleat tips 21 and 31, as signified by the arrows in FIG. 1). In such cases, a bridging filament may extend between, and be bonded to, e.g. three, four, eight, or more pleat tips 21. In some embodiments, at least some bridging filaments may be continuous, meaning that they extend along at least substantially, or essentially, the entire length of pleated filter media 10 (as in the exemplary design of FIG. 1). In this context, the term length will denote the direction along the pleated filter media that is orthogonal to the pleat direction; the term width will denote the direction along the pleated filter media that is aligned with the pleat direction. However, these terms are used for convenience of description and are non-limiting; for example in some embodiments the width of a pleated filter may be greater than the length of the pleated filter. Continuous bridging filaments will not be severed or otherwise made discontinuous anywhere along the entire length of pleated filter media 10. In any case, bridging filaments (whether continuous or not) will be distinguished from filaments that are cut or otherwise made so short that they do not extend between at least two pleat tips (and are not bonded to other filaments in such manner to collectively form bridging filaments, as discussed above).

In some embodiments at least some, or substantially or essentially all, of bridging filaments 40 are at least generally straight (when pleated filter 1 is in a nominally planar configuration), as shown in exemplary embodiment in FIG. 1. In embodiments of this general type, at least some, or substantially or essentially all, of the bridging filaments 40 may be at least generally, substantially, or essentially, parallel to each other, again as shown in exemplary illustration in FIG. 1. However, other arrangements are possible, as discussed later herein.

Bridging filaments 40 can advantageously help maintain the pleat spacing of pleated filter media 10, e.g. during handling of filter 1 and installing of filter 1 onto an arcuate filter-support layer as discussed later herein. However, bridging filaments 40 by definition do not serve to rigidify pleated filter 1 to the point that, in the absence of a filter-support layer provided by the HVAC system, filter 1 can withstand the forces encountered when used in an HVAC system. It will thus be appreciated that bridging filaments 40 can help maintain the pleat spacing while still allowing pleated filter 1 to be conformable (and without causing pleated filter 1 to be self-supporting).

Figure 3:
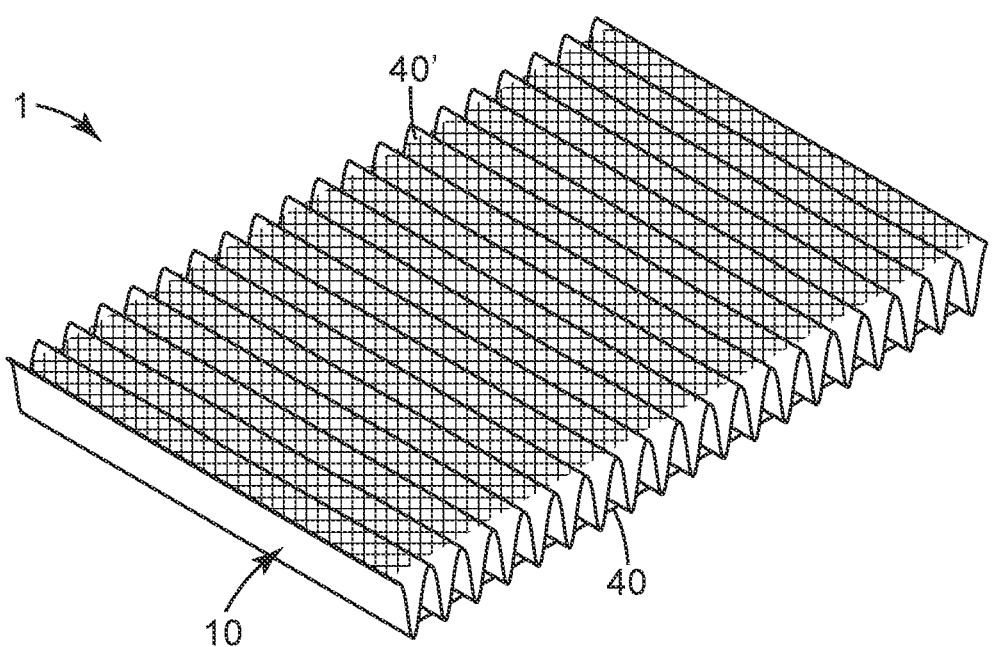
FIG. 3 is a perspective view of another exemplary conformable, unframed, non-self-supporting pleated air filter, in a nominally planar configuration.
Figure 4:
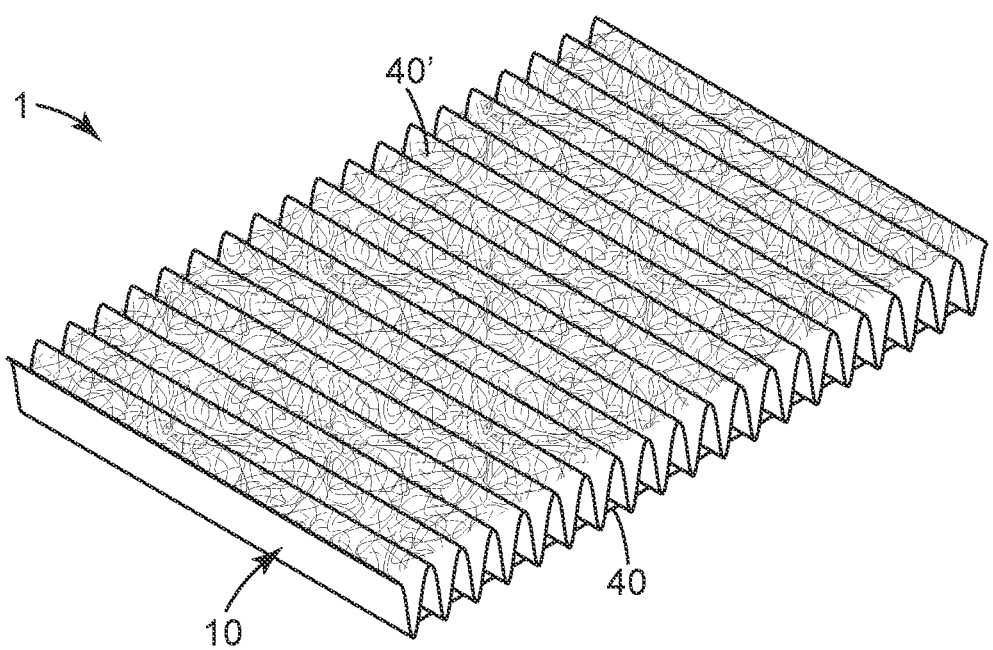
FIG. 4 is a perspective view of another exemplary conformable, unframed, non-self-supporting pleated air filter, in a nominally planar configuration.

In embodiments of the general type shown in FIGS. 3 and 4, a first set of bridging filaments may be provided on one face of pleated filter media 10, and a second set of bridging filaments may be provided on the second, opposite face of pleated filter media 10, as long as such arrangements allow the pleated filter and media to be conformed as disclosed herein. The first and second sets of bridging filaments may be similar or the same; or they may be different. In FIG. 3, a first set of bridging filaments 40' takes the form of a regular array provided by a pre-existing netting whose strands are oriented at approximately 45 degree angles away from the conforming axis of the pleated filter media; the second set of bridging filaments is comprised of bridging filaments 40" (only one of which filaments is visible) that are approximately aligned with the conforming axis of the pleated filter (much like those of FIGS. 1 and 2). In FIG. 4, a first set of bridging filaments 40' takes the form of a random array provided by a pre-existing fibrous scrim (e.g., a nonwoven) comprised of e.g. randomly-oriented fibers; the second set of bridging filaments is comprised of bridging filaments 40" that are approximately aligned with the conforming axis of the pleated filter (much like those of FIGS. 1 and 2).

Any suitable bridging filaments 40 may be used, made of any suitable materials. In some embodiments, filaments 40 may be non-elastic. Non-elastic as defined herein encompasses any material that does not have the relatively high reversible extensibility (characterized e.g. by the ability to be reversibly elongated to e.g. 100% or more without undergoing plastic deformation) characteristic of elastic materials such as natural rubber, SBR rubber, lycra, etc. Thus, common polymeric materials, e.g. extrudable materials (including but not limited to e.g. polypropylene, poly (lactic acid), polyethylene terephthalate and the like), may be used to form filaments 40. In other embodiments, filaments 40 may be made of an elastic material (chosen from e.g. the above-listed materials). In particular embodiments in which bridging filaments are present on the upstream side of pleated filter media, it may be advantageous that such bridging filaments be made of an elastic material. In some embodiments, filaments 40 as disclosed herein are flexible, meaning that filaments 40 can be easily and reversibly bent, curved, etc., merely by the act of manually conforming the entire filter (as opposed to having to separately manipulate each filament or filament segment). Such flexible filaments (which are distinguished from e.g. hardened strands of adhesive as described e.g. in U.S. Pat. No. 7,235,115 to Duffy) may advantageously allow pleated filter media 10 to be conformed e.g. to a relatively small radius of curvature if desired.

In various embodiments, filaments 40 may comprise an average diameter (or equivalent diameter in the case of filaments with a non-circular or irregular cross-section) of at most about 2, 1, 0.5, 0.2, or 0.1 mm. In further embodiments, filaments 40 may comprise an average diameter or equivalent diameter of at least about 0.05, 0.10, or 0.20 mm. Filaments 40 may comprise any suitable shape when viewed in cross section, (e.g., generally round, square, oblong, etc.). Filaments 40 can comprise suitable spacings between individual filaments as desired (e.g., when filaments 40 are arranged e.g. in parallel to each other so that such an average spacing can be measured). In various embodiments, the filament spacing can be at least about 2, 4, 6, 8, 16 or 24 mm. In additional embodiments, the filament spacing can be at most about 50, 40, 30, 20, 15, 12, 10, or 8 mm. The filament spacings can be relatively constant or can be varied. Some inherent variation in filament spacing may occur in production and handling of filaments, of course. Regardless of the specific arrangements, a suitable set of filaments 40 will collectively comprise a highly open structure (in various embodiments, comprising greater than at least 80, 90, or 95% open area) so as to allow sufficient airflow through pleated filter media 10.

Filaments 40 may be made of any material, provided in any form and in any manner, as long as the material, in combination with the dimensions (e.g., width, thickness) of the filaments, provides the desired combination of physical properties (e.g., flexibility and inextensibility). Such materials may include organic polymeric materials (whether naturally occurring or synthetic, including those already mentioned above), or inorganic materials (e.g., fiberglass), metals (such as metal meshes, as long as they are sufficiently flexible to allow the pleated filter to be conformed) and so on. In some embodiments, filaments 40 are not made of metal or of inorganic materials such as fiberglass. In specific embodiments, bridging filaments 40 are not comprised of a shape-memory polymer. In other specific embodiments, bridging filaments 40 are not comprised of any kind of (hardened) glue or adhesive, e.g. hot-melt adhesive or drizzle glue. In some embodiments, at least some bridging filaments 40 may be functionalized, e.g. to comprise sorbent properties, antimicrobial properties, catalytic properties, and so on. Bridging filaments may include pigment, dye, and so on, in order to achieve any desired aesthetic effect.

As discussed above, in some embodiments, filaments 40 may take the form of individual filaments that are individually provided (e.g., polymeric filaments that are extruded onto pleat tips of pleated filter media 10 as described later herein). In other embodiments, filaments 40 may be provided as filaments of a scrim. In this context, the term scrim is used to broadly encompass any collection of filaments that are in contact with each other, achieved by any method of manufacture. Specifically, the term scrim is not limited to organic polymeric materials but may be chosen from e.g. inorganic scrims made of fiberglass, and so on, as long as such scrims exhibit sufficient flexibility to allow the pleated filter media to be conformable as described herein. In many embodiments, a scrim may be a pre-existing scrim, meaning a scrim that has been pre-made and that has sufficient mechanical integrity to be handled, and brought into contact with the pleat tips and bonded thereto, as a unit.

In some embodiments of this general type, a collection of bridging filaments 40 may be provided in the form of e.g. a plastic mesh or netting, a knit or woven fabric, and so on (noting however that any such material does not necessarily have to be aligned so that any set of filaments of the material is essentially, or even generally, aligned with the conforming direction of the pleated filter media.) Scrim 40' of FIG. 3 (a netting with all filaments appearing to be oriented about 45 degrees off-axis from the conforming axis) is an exemplary embodiment of this general type.

In some embodiments, such a scrim may comprise at least some bridging filaments 40 that are oriented generally orthogonal to the pleat direction and that are parallel to each other (e.g., that are oriented in similar manner to the filaments 40 of FIG. 1), with other filaments also present that may or may not be bridging filaments and that may be oriented in various directions. Some exemplary scrims of this general type are the tri-directional scrims disclosed in U.S. Pat. No. 8,231,700 to Sundet.

In some embodiments, rather than being completely or even partly comprised of a regular array of e.g. parallel filaments, filaments 40 may be present in a wide variety of orientations (and spacings). Such filaments may follow curves, loops, tortuous paths, and so on, as long as a sufficient number of filaments collectively bridge the gaps between pleat tips 21 to serve as bridging filaments. That is, filaments 40 may be provided as part of a scrim that comprises a collection of e.g. randomly-oriented filaments, as long as such filaments are sufficiently long and are bonded and/or entangled with each other to serve as bridging filaments as defined herein. Scrim 40' of FIG. 4 is an exemplary embodiment of this general type. Such a scrim might be e.g. a spun-bonded web, spun-laced web, a carded web, a Rando web, a laminate of multiple webs, and so on.

It is thus emphasized that bridging filaments 40 may be provided in a wide variety of ways. However, in some particular embodiments, bridging filaments 40 are provided only in the form of filaments that are oriented at least substantially parallel to each other, are at least substantially aligned with the conforming axis of the pleated air filter media, and are not connected with each other by any other filaments. Such embodiments preclude the use of filaments that are part of e.g. a pre-existing scrim that includes filaments oriented in a wide variety of directions; e.g. scrims with multi-directional fibers such as tri-directional scrims and the like. Moreover, any such set of bridging filaments (regardless of the particular arrangement), which serves to help maintain pleat spacing during handling of the pleated filter, will be distinguished from a support structure or structures that are e.g. provided on the downstream side of a pleated filter (and that are often bonded to a perimeter frame thereof and/or are bonded to the pleated filter media itself) to rigidify the pleated filter media. In other words, a set of bridging filaments as disclosed herein does not encompass e.g. perforated sheets of cardboard or metal, or strips of cardboard or metal, as are often provided on the downstream side of a pleated filter to enable the pleated filter to withstand the forces encountered in a high-pressure HVAC airflow condition in the absence of a filter-support layer.

Filter Media

Pleated filter media 10 may be any suitable non-self-supporting pleated media that is capable of being conformed as described herein. Potentially suitable materials may include e.g. paper; porous films of thermoplastic or thermoset materials; nonwoven, such as melt blown or spunbond, webs of synthetic or natural fibers; scrims; woven or knitted materials; foams; electret or electrostatically charged materials; fiberglass media; or laminates or composites of two or more materials. A nonwoven polymeric web comprised of polyethylene, polypropylene or poly(lactic acid) may be suitable, for example. Any suitable method of making a nonwoven web (e.g., melt-blowing, melt-spinning, carding, and so on) may be used. Filter media 10 may also include sorbents, catalysts, and/or activated carbon (granules, fibers, fabric, and molded shapes).

Multilayer media, e.g. laminated media, can also be used as filter media 10. Such media may consist of laminated layers of the media discussed above or of other substrates laminated to one or more layers of filter media, for example. In some embodiments, a prefilter layer may be used on the upstream side of filter media 10. Such a prefilter layer may comprise e.g. polypropylene, polyethylene, polyethylene terephthalate, poly(lactic acid), or blends of these materials. In other words, in some embodiments pleated filter media 10 may comprise a base (e.g., filtration) layer, along with any other layer or layers as desired for any purpose, as long as it allows pleated media 10 to remain non-self-supporting as defined and described herein. For example, a highly open plastic netting or mesh might be laminated to the pleated media, in order to e g enhance the abrasion resistance of the media. Any such layer may be bonded to e.g. a base (e.g. filtration) layer by any suitable method, e.g. by melt-bonding, by way of an adhesive (hot melt adhesive, pressure-sensitive adhesive, and so on), calendering, ultrasonic bonding, etc.

In specific embodiments, pleated filter media 10 may be an electret material, comprised of e.g. any charged material, e.g. split fibrillated charged fibers as described in U.S. Patent RE 30782. Such charged fibers can be formed into a nonwoven web by conventional means and optionally joined to a scrim such as disclosed in U.S. Pat. No. 5,230,800 forming an outer support layer. In other specific embodiments, filter media 10 can be a melt blown microfiber nonwoven web, e.g. such as disclosed in U.S. Pat. No. 4,813,948, which can optionally be joined to a secondary layer during web formation as disclosed in that patent, or subsequently joined to a secondary web in any conventional manner. Filtration media that may be particularly suitable for certain applications might include e.g. media of the general type described in U.S. Pat. No. 8,162,153 to Fox; media of the general type described in U.S. Patent Application Publication 20080038976 to Berrigan; and, media of the general type described in U.S. Patent Application Publication 20040011204 to Both, and media generally known as tribocharged media. Any such media can be charged to form an electret, if desired.

In order to be conformable as described herein, pleated filter media 10 may advantageously exhibit a relatively low stiffness. In some embodiments, the stiffness of the media may be characterized by a Taber Stiffness (measured as described in U.S. Pat. No. 7,235,115, which is incorporated by reference herein for this purpose). In various embodiments, pleated filter media 10 may be comprised of a material that exhibits a Taber Stiffness of less than 1.0, 0.8, 0.6, or 0.4 Taber Stiffness Units. In some embodiments, the stiffness of the media may be characterized by a Gurley Stiffness (measured as described in U.S. Pat. No. 7,947,142, which is incorporated by reference herein for this purpose). In various embodiments, pleated filter media 10 may be comprised of a material that exhibits a Gurley Stiffness of less than 100, 80, or 60 mg.

Figure 5:
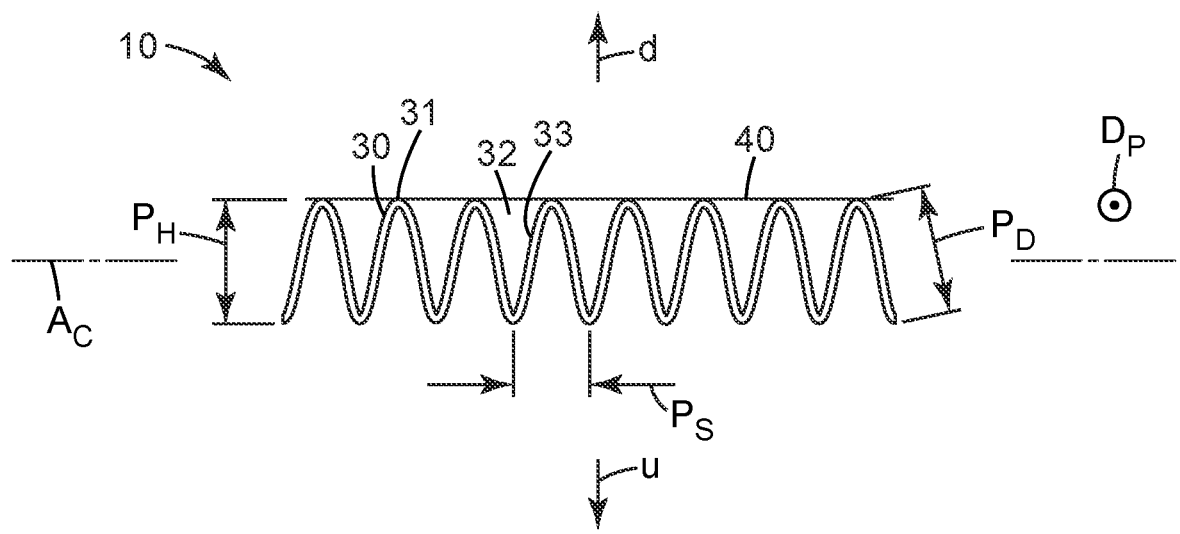
FIG. 5 is a side schematic cross sectional view of a portion of an exemplary conformable, non-self-supporting pleated air filter media, in a nominally planar configuration.

Detail of pleat geometry are discussed with reference to the side view of FIG. 5 (in which the pleated air filter is viewed along the pleat direction $D_p$). Pleat spacing, pleat height, and pleat distance as defined herein are evaluated (as is the previously-described planarity of filaments 40) with the pleated air filter media 10 in a nominally planar configuration in which the pleated filter media 10 exhibits a readily recognizable major plane (notwithstanding the local deviations from this plane that are inherent in each pleat). In further detail, this may be achieved e.g. by placing the pleated filter media on a flat surface such as a tabletop, with the pleated media neither having an elongating (expanding) force applied thereto, nor being subjected to any force that would push it together (accordionize it), excepting of course any slight force that might be naturally present by virtue of the bridging filaments). Furthermore, no compressing force (that might e.g. crush the pleats against the tabletop) is applied in such a configuration.

In such a configuration, the pleat height (pleat amplitude) is the distance ($P_h$ in FIG. 5) from upstream tip to downstream tip, along a direction that is orthogonal to the overall major plane of filter 1/filter media 10. In various embodiments, the pleat height of media 10 can be at least about 2, 4, 6 or 8 mm. In further embodiments, the pleat height may be at most about 40, 30, 25, 20, 15, 12, 10, 5, or 3 mm.

In such a configuration, the pleat spacing ($P_s$ in FIG. 5) is the distance between nearest-neighbor same-side pleat tips, along a direction that is in the major plane of the filter media and is aligned with the conforming axis $A_c$. Pleated filter media 10 may comprise any suitable pleat spacing. In various embodiments the pleat spacing may be at most about 30, 20, 16, 12, 10, or 8 mm; in further embodiments the pleat spacing may be at least about 3, 4, 5, 6, 8, or 10 mm.

The pleat distance ($P_d$ in FIG. 5) is the shortest distance from one pleat tip to a nearest-neighbor pleat tip along the local direction of the pleated media (by way of specific example, if the first pleat tip is an upstream pleat tip its nearest-neighbor pleat tip for purposes of this measurement will be a downstream pleat tip). Pleated filter media 10 may comprise any suitable pleat distance (although, for any given pleated filter media, the pleat distance will be larger than the pleat height). In various embodiments, the pleat distance of media 10 can be at least about 2, 3, 4, 5, 6, 7, 8, 9, or 10 mm. In further embodiments, the pleat distance may be at most about 40, 30, 25, 20, 15, 10, 5, or 3 mm.

In some embodiments the pleats of pleated media 10 may be sinusoidal, meaning that the tips of such pleats have an average radius of curvature of at least about 2 mm. In various embodiments, such sinusoidal pleats may comprise tips with an average radius of curvature of at least about 3, 4, 5, or 6 mm. Sinusoidal pleats as disclosed herein are distinguished from e.g. "zig-zag" style pleats that comprise extremely flat walls that meet at pleat tips with extremely small radii of curvature. (Such zig-zag style pleats are often used in e.g. self-supporting filter media and are often achieved e.g. by scoring the filter media to provide a score line, along which the media is then folded to form a very sharp pleat.)

It will be appreciated that the pleat parameters (particularly the pleat height) may be chosen so as to enhance the ability to conform pleated filter 1. In particular, a pleat height that is relatively low in comparison to the average radius of curvature of the pleated media (when in the second, conformed configuration) may be advantageous. Thus in various embodiments, the ratio of the average radius of curvature to the pleat height may be at least about 20, 40, 60, 80, or 100. In further embodiments, the ratio of the average radius of curvature to the pleat height may be at most about 1000, 800, 400, 200, or 100.

As noted previously, in some embodiments bridging filaments 40 may be made of an elastic material. In some such embodiments, the elastic properties of the bridging filaments may be such that (along with e.g. the pleated filter media exhibiting relatively low stiffness) pleated filter 1 is expandable (stretchable) along conforming axis $A_c$. By this is meant that pleated filter 1 is able to be stretched, from a nominally planar configuration as described above, to an expanded length that is greater than the (unexpanded) length of pleated filter 1 when in the nominally planar configuration. Commensurate with this, the pleat spacing $P_s$ will likewise increase to an expanded value, as allowed by the elasticity of the bridging filaments. In various embodiments in which pleated filter 1 is expandable, the ratio of the expanded pleat spacing to the nominal (unexpanded) pleat spacing may be at least about 1.2, 1.4, 1.6, 1.8, 2.0, or 2.5. In various embodiments in which pleated filter 1 is expandable, the ratio of the expanded length of pleated filter 1 to the nominal (unexpanded) length of pleated filter 1, may likewise be at least about 1.2, 1.4, 1.6, 1.8, 2.0, or 2.5.

An expanded pleated filter 1 may be installed on a filter-support layer in like manner as described for any pleated filter 1 (as discussed in detail herein). It will be appreciated that the property of expandability can allow a pleated filter to be used as-is, or to be expanded as desired, to fit the length of a particular filter-support layer. (The expanded pleated filter may be e.g. attached or fastened to the filter-support layer so that the filter is maintained in the expanded configuration.) This property may thus advantageously allow a pleated filter 1 to be used with a variety of filter-support layers.

Non-Self-Supporting

As discussed earlier herein, pleated filter media 10 (and pleated filter 1) is non-self-supporting. That is, even though bridging filaments 40 may help to maintain the pleat spacing of pleated filter media as disclosed earlier herein, the presence of bridging filaments 40 is not sufficient to render pleated filter 1 self-supporting. By non-self-supporting is meant a pleated air filter/media that, when placed in a conventional perimeter-holding fixture of a forced-air HVAC system (specifically, when not on an upstream surface of a filter-support layer of an HVAC system as described herein), is unable (with or without a supporting perimeter frame) to withstand the forces developed when air impinges the upstream face of the air filter media (e.g. so as to develop a pressure drop of at least 0.2 inch of water). (This and all other references herein to pressure drop through an air filter media, are for the air filter as initially inserted in the system, before any appreciable loading of particulate matter into the filter media has occurred.) By unable to withstand such forces means that the pleated air filter media collapses, deforms, becomes dislodged, ruptures, or the like, so as to render the performance of the air filter media unsatisfactory.

A non-self-supporting pleated air filter by definition does not encompass any pleated air filter that is usable in an HVAC system without the necessity of being installed on an upstream face of a filter-support layer of the HVAC system. (The ordinary artisan will appreciate that in some cases a pleated air filter may be easily discerned as being non-self-supporting e.g. merely by inspection of how conformable (in some cases, even relatively limp and floppy) the pleated filter is (even in the presence of bridging filaments) in comparison to e.g. a pleated filter with a reinforcing wire mesh layer and/or a rigidifying perimeter frame.

In at least some embodiments pleated filter media 10 may be compressible, defined herein as meaning that the pleats of the filter medium will significantly compress in an upstream-→downstream direction when the pleated filter is mounted on a filter-support layer of an HVAC system so as to experience a pressure drop of at least 0.2 inch of water. While high pressures might crush a compressible pleated filter media against the filter-support layer in such manner as to e.g. cause deterioration in the filtering performance, the low pressures developed in e.g. mini-split HVAC systems may allow that a compressible material may be satisfactorily used in such systems. (It is noted in passing that here and elsewhere the term HVAC is used in general for convenience; the term encompasses systems that in at least some circumstances may only heat air, may only cool air, or even may only circulate the air rather than heating or cooling it.)

By definition a compressible pleated filter medium cannot have a reinforcing layer of permanently deformable material pleated along therewith and continuously bonded to it. By permanently deformable material is meant a reinforcing material (such as perforated metal layer, metal wire mesh, expanded metal, etc.) that, upon being pleated, tends to remain in the pleated configuration (and thus to hold the pleated media to which it is bonded in that same configuration so that it is no longer compressible). An example of such a permanently deformable metal layer (an open wire mesh) is described in Example 1 of U.S. Pat. No. 8,162,153 to Fox. This can be contrasted to materials (such as e.g. plastic netting, non-woven scrims, pre-filter layers and the like) that, even after being pleated (e.g. along with the filter media), do not resist deformation to a sufficient extent to render the pleated media non-compressible.

Separate from and irrespective of the above-listed requirement that a compressible pleated filter medium cannot have a reinforcing layer of permanently deformable material (e.g., metal) pleated along therewith and continuously bonded to it, a non-self-supporting pleated filter as disclosed herein will not comprise any rigidifying support member that is attached (in any way or by any mechanism) to any portion of the air-transmissive area of the downstream face, or of the upstream face, of the pleated air filter media as supplied to an end-user. The term rigidifying support member signifies any single member, or group of members (including but not limited to: one or more strips of paperboard, plastic or metal; and/or any perforated sheetlike layer of e.g. paperboard, plastic, or metal) whose purpose is to enable the pleated filter to withstand the forces encountered in an HVAC airflow in the absence of a filter-support layer.

By definition, pleated filter media 10 (and pleated filter 1) do not include any kind of rigidifying perimeter frame. Specifically, no e.g. rigid support frame (e.g., a channel frame of the general type disclosed in U.S. Pat. No. 8,685,129, a pinch frame of the general type disclosed in U.S. Pat. No. 8,702,829, and the like) is applied to the perimeter of pleated filter media 10. However, this does not preclude the presence of one or more ancillary components e.g. proximate an edge of pleated filter media 10. Such a component will be described by the term "border strip" for convenience herein. By definition, any such border strip or strips must serve some function (e.g., a fastening function, a decorative function, and so on) other than rigidifying pleated filter 1 so that pleated filter 1 cannot be conformed as disclosed herein. The ordinary artisan will readily appreciate that while, in some embodiments, such a border strip might impart some degree of lateral stiffness along the width of the noncorrugated edges of pleated filter 1 (which might e.g. make it easier to grasp a noncorrugated end of the pleated filter without it curling or drooping), such a border strip by definition will not impact the ability to conform the pleated filter along conforming axis $A_c$.

Regardless of the specific composition and function, any such border strip will comprise a total thickness (in the upstream-downstream direction) that is quite small (e.g., less than 3, 2, or 1 mm) Such a border strip will thus be distinguished from e.g. a section of a perimeter frame (such as a channel frame or the like), such perimeters frames often having a thickness of e.g. 20 mm or more. In general, such a border strip may often take the form of a layer (whether made of cloth, paper, etc.) that is attached proximate a noncorrugated edge of pleated filter 1. By way of specific example, one or more edges (e.g., noncorrugated edges 5 or 5") of pleated filter 1 might comprise e.g. a strip of mechanical fastening material (e.g., a hook strip or a loop strip of a hook-and-loop fastening system), a strip of pressure-sensitive adhesive, and so on (which might assist in installing the pleated filter on a filter-support layer of an HVAC system). Or, a border strip may allow the user to record the date of initial usage thereon. In some embodiments, a border strip may be a separately-provided layer that is attached to an edge, e.g. a noncorrugated edges, of pleated filter 1. In other embodiments, a border strip may be provided by way of densifying (e.g., by calendering, ultrasonic welding, needle-tacking, and so on) an edge, e.g. a noncorrugated edge, of the pleated filter media.

Filter media 10 can be pleated by any suitable method by which pleats may be formed in a media prior to bridging filaments 40 being bonded to pleat tips thereof (noting that the term pleated filter media as used herein does not encompass filter media that is formed into a folded or puckered shape by way of the e.g. shrinking of a shape-memory polymer that is attached to portions thereof). Particularly advantageous methods might include the processing of the media through a set of corrugating gears, e.g. in any suitable variation of the methods disclosed in e.g. U.S. Pat. No. 5,256,231. Bridging filaments 40 may be bonded to pleat tips of a pleated filter media 10 by any suitable method. If the filaments are provided as a pre-existing scrim, such a scrim can be applied to a face of pleated filter media 10, and bonded to at least some of the pleat tips thereof, by any suitable method. For example, a scrim may be obtained e.g. as a continuous roll, a bonding adhesive can be applied thereto (e.g., by coating the adhesive onto at least some surfaces of filaments of the scrim), and the scrim then contacted with the pleated media so as to cause bonding between adhesive-coated portions of the filament and portions of the pleat tips that they are contacted with.

Other bonding methods (e.g., ultrasonic bonding, melt-bonding (including e.g. heat-sealing), and so on), are also possible. In embodiments in which filaments 40 are not provided as part of a pre-existing scrim, they may be conveniently melt-extruded onto the pleat tips of a pleated filter media, e.g. while the media is still resident on a corrugating (pleating) gear or any other kind of corrugating apparatus. Such methods could be any suitable variation of the methods disclosed in e.g. U.S. Pat. Nos. 5,256,231, 5,620,545, and 7,052,565, all of which are incorporated by reference herein in their entirety. In embodiments in which filaments 40 are melt-bonded to the pleat tips of media 10, the composition of filaments 40 and the fibers of media 10 (specifically, the outermost fibers of media 10, if media 10 comprises multiple layers) may be advantageously chosen to facilitate such melt-bonding. For example, the filaments and fibers may be made of materials that are sufficiently compatible to allow melt-bonding to occur. In specific embodiments, filaments 40 and the fibers of media 10 may be comprised of the same type of polymer (e.g., they may both be polypropylene; they may both be poly (lactic acid), etc.). It will be noted that in some circumstances (e.g., when the filaments 40 are melt-extruded onto the pleat tips) some penetration of the molten filament material into the spaces between the fibers of media 10 may occur, which may augment the bonding process by achieving at least some physical entanglement or entrapment.

However provided, in at least some embodiments filaments 40 may be provided (e.g. in a spaced-apart manner) generally across the entire width of the pleated filter media (as shown in the Exemplary embodiment of FIG. 1). Pleated filter media 10 may be trimmed or cut to the desired final width before or after the bonding of the filaments thereto, as desired.

HVAC System

Non-self-supporting pleated filter 1 may be used in any suitable application in which moving air, motivated by an HVAC system, is desired to be filtered. (An HVAC system by definition involves air that is motivated by a mechanized fan or blower, thus excluding e.g. air that is motivated by the breathing of a person).

Figure 6:
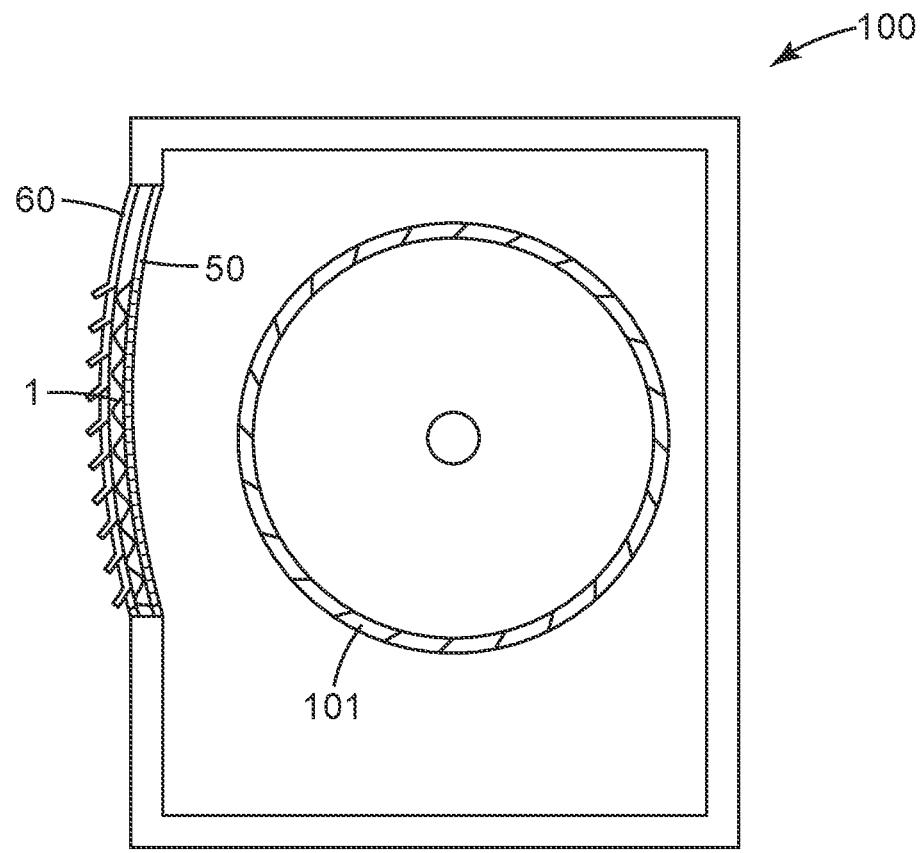
FIG. 6 is a side schematic cross sectional view of a portion of an exemplary HVAC system comprising an exemplary conformable, unframed, non-self-supporting pleated air filter.
Figure 7:
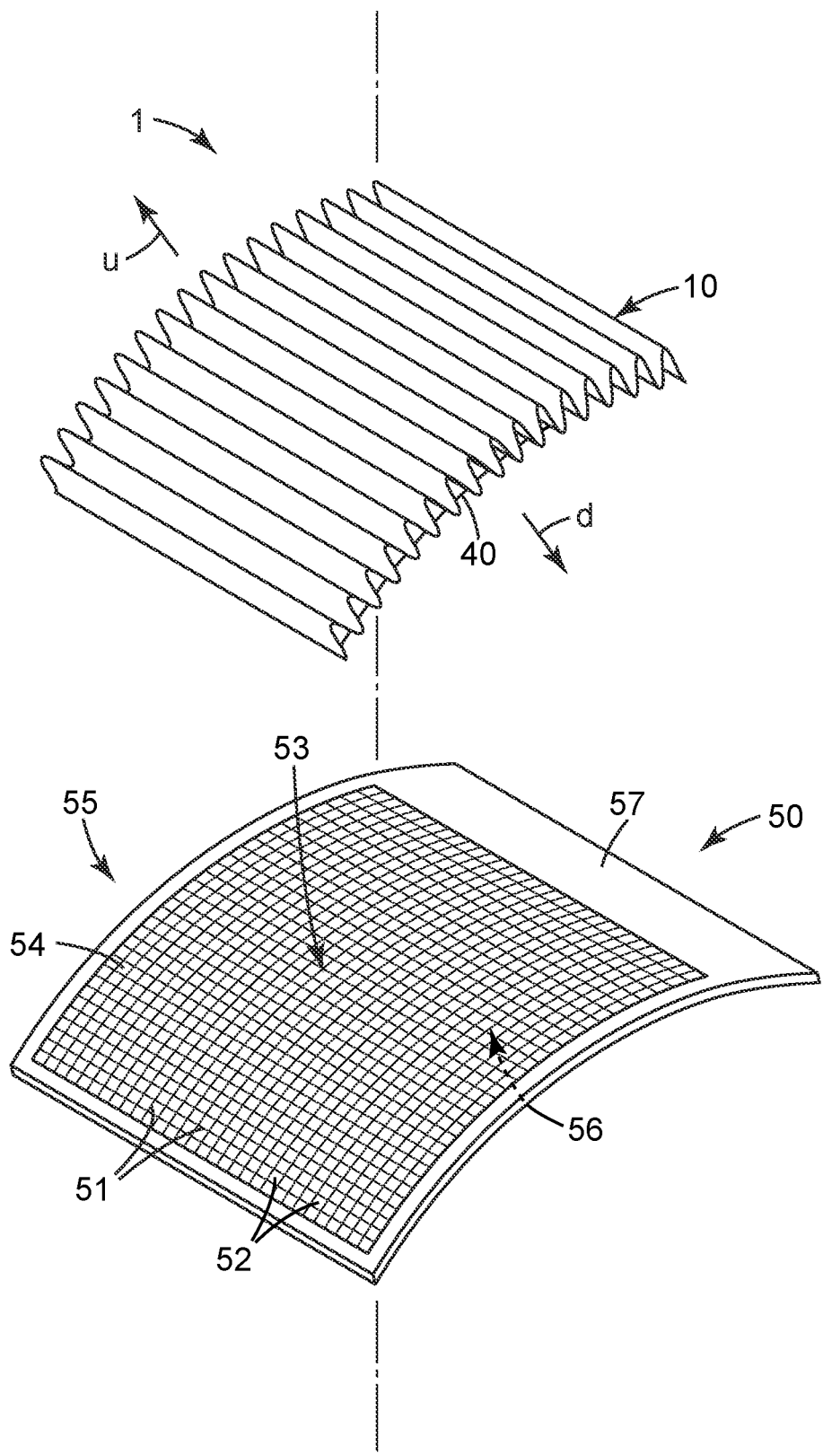
FIG. 7 is a perspective exploded view of an exemplary pleated air filter conformed into an arcuate configuration and mounted onto an arcuate, filter-support layer.

With reference to the exemplary embodiments shown in FIGS. 6 and 7, pleated filter 1 will be installed on the upstream face 55 of an arcuate filter-support layer 50 of an HVAC system 100. It is noted that FIG. 6 depicts an intake portion of an HVAC system (e.g., a mini-split system) in idealized, generic representation and is non-limiting. For example, while an air filter is typically positioned upstream of fan 101 (e.g. so that the filter can help to protect fan 101 and thermal-exchange components of the HVAC system from particulate debris), filter 1 is not necessarily in close physical proximity to fan 101. If desired (for e.g. aesthetic purposes and/or to protect filter 1 from damage) a filter cover 60 may be positioned upstream of filter 1 as depicted in FIG. 6. Filter cover 60 should allow sufficient airflow to enable the functioning of the HVAC system and thus may be e.g. a perforated sheet material, a mesh or screen, a louvered or windowed material, and so on, of any suitable type. In many embodiments, filter cover 60 may have a negligible effect on the airflow through filter 1 and into the HVAC intake. In some embodiments, filter cover 60 may be e.g. solid but may be offset outwardly from filter 1 a sufficient distance to allow sufficient airflow thereto.

The ordinary artisan will appreciate that some forced-air systems are centralized systems in which air that is collected from multiple air-return inlets (e.g., located in multiple rooms in a building) is returned to a central blower (passing through a filter enroute). Such systems often move relatively large quantities of air and thus may cause relatively large pressure drops to occur through a filter mounted therein. Such centralized systems will be distinguished from e.g. mini-split systems that often only collect air locally via a single air return and that may often operate at significantly lower pressures. It will be appreciated that while pleated filter 1 may be particularly suited for use in e.g. mini-split HVAC, in at least some embodiments pleated filter 1 may be used in a centralized HVAC system as long as it is installed on a filter-support layer of the HVAC system. Thus, for example, individual pleated filters 1 might be provided e.g. in multiple individual air intakes or returns of a centralized HVAC system.

As shown in closer detail in the exploded view of FIG. 7, filter 1 will be conformed to the shape of upstream face 55 of arcuate filter-support layer 50 of HVAC system 100. In many embodiments, pleated air filter 1 (e.g., at least downstream tips 30 thereof) may be in direct contact with upstream face 55 of filter-support layer. In various embodiments, filter-support layer 50 may be permanently attached to the HVAC system (e.g., to the housing of the HVAC system intake portion); or, it may be removable from the HVAC system e.g. for ease of installing a pleated filter 1 thereon (after which filter-support layer 50 with filter 1 thereon, is replaced into the HVAC system). In either case, filter-support layer 50 by definition is a component of the HVAC system; it is not a component of pleated filter 1 as pleated filter 1 is supplied to an end user. In other words, no rigidifying perimeter frame, rigidifying support member or the like, that is attached (directly or indirectly) to pleated filter 1 as filter 1 is supplied to a user, will qualify as a filter-support layer 50 of an HVAC system.

Filter-support layer 50 comprises an upstream face 55 as noted, and a downstream surface 56. It comprises an air-transmissive area 53 that comprises through-openings 52 through which air can easily pass to reach the interior of the HVAC intake portion. However, air-transmissive area 53 does comprise solid portions 51 that serve to support pleated filter 1. Such solid portions 51 may take the form of e.g. struts of a grid (whether regular or irregular in arrangement) as in the exemplary embodiment of FIG. 7; or, air-transmissive area 53 may take the form of a solid sheet material 51 with numerous perforations 52 therethrough. In many embodiments, at least air-transmissive area 53 may take the form of a mesh or screen, which may advantageously allow airflow therethrough while adequately supporting pleated filter 1. Some materials comprising randomly oriented fibers (such as e.g. a metal mesh) may comprise through-openings in the form of tortuous paths. (It will be appreciated that in many instances there may not be a bright-line distinction between air-transmissive materials in various categories such as e.g. screens, meshes, grids, perforated sheets and like materials.) In various embodiments, the through-openings of air-transmissive area 53 of filter-support layer 50 may comprise an average diameter (or equivalent diameter in the case of noncircular through-openings) of less than about 8, 6, 4, 3, 2, 1, 0.4, or 0.2 mm.

In some embodiments air-transmissive area 53 may make up a significant portion (e.g., at least 60, 80, 90, or 95% or more), of the total area of filter-support layer 50. In some embodiments, one or more relatively (e.g., completely) non-air-transmissive areas may be provided (one such area 57 is shown in exemplary embodiment in FIG. 7). Such areas may e.g. facilitate attaching filter-support layer 50 to the other components of the HVAC system, installing pleated filter 1 on filter-support layer 50, or may serve any other purpose.

Filter-support layer 50 (e.g., at least the air-transmissive area 53 thereof) may conveniently be provided in a permanently arcuate shape (although it may be reversibly flexible to at least some extent) e.g. by being molded in that shape. Or, in some embodiments filter-support layer 50 may be a metal screen or mesh that has been formed into the desired arcuate shape. Pleated filter 1 may thus be conformed to match that shape, when installed on filter-support layer 50. In various embodiments, arcuate filter-support layer 50 may exhibit a radius of curvature (averaged over the length of the air-transmissive area 53 thereof) of less than about 100, 80, 60, 40, 20, or 10 cm.

It will be appreciated that in many embodiments pleated filter 1 may be installed on filter-support layer 50 (and filter-support layer 50 attached to the other components of the HVAC system) so that corrugated edges 4 and 4' (as pointed out in FIG. 1) are unoccluded edges. By unoccluded is meant that when the pleated filter 1/filter-support layer 50 assembly is installed into the HVAC system, the corrugated edges are not blocked or obstructed by any solid material such as e.g. a protruding flange or wall of filter-support layer 50, or a wall or surface of some other component of the HVAC system. (No sidewall of a perimeter frame of pleated filter 1 may block these edges, since pleated filter 1 has no such frame). It will be appreciated that the presence of unoccluded edges can allow at least some incoming air to bypass filter 1; that is, to go around the unoccluded edges so as to reach the interior of the HVAC intake without first passing through pleated filter 1. In the use of pleated filters in HVAC systems, it has been conventional to provide a frame sidewall, and/or to mount a pleated filter so that any noncorrugated edges closely abut a surface of the HVAC system, to minimize or prevent such bypass phenomenon. The inventors have found that some amount of such bypass does not seem to significantly detract from the filtration performance. (It is noted that in many embodiments filter-support layer 50 may be e.g. a mesh or screen with relatively small through-hole sizes so that any relatively large particulate debris (e.g., pet hair, dirt, and so on) that may bypass filter 1 may still be captured rather than reaching the interior of the HVAC system.

In fact, it has been found that in some embodiments pleated air filter 1 need not necessarily overlie the entire air-transmissive area 53 of the filter-support layer 50. That is, pleated filter 1 may be shaped and sized so that when it is installed on the upstream face 55 of filter-support layer 50, at least one bypass region 54 is present in some area of filter-support layer 50 (e.g., near one or more edges thereof) through which bypass region air can pass without first passing through pleated filter 1. Thus in various embodiments, pleated filter 1 may be configured so that, when it is installed on filter-support layer 50, a bypass ratio (defined as the ratio of the bypass region 54 to the total air-transmissive area 53 of filter-support layer 50) is obtained that is at least about 5, 10, 15, or 20%. In further embodiments, such a bypass ratio may be at most about 40, 30, 20, or 15%.

Pleated filter 1 may be installed on upstream face 55 of filter-support layer 50 by any suitable means. For example, adhesive strips (e.g., at first and/or second noncorrugated edges 5 and 5' of filter 1) may be provided which can adhesively attach one or both ends of filter 1 to receiving areas at one or both ends of filter-support layer 50. Or, any kind of mechanical fastening system (such as the hook and loop systems mentioned earlier) may be used. In some embodiments, pleated filter 1 (as supplied to an end user) may thus have components mounted thereto to facilitate installation onto filter-support layer 50. In other embodiments, pleated filter 1 as supplied may simply be a section of pleated air filter media 10. In such cases, filter-support layer 50 may have components (e.g. pins) e.g. at corners of filter-support layer 50, onto which pleated filter 1 may be impaled. Or, filter-support layer 50 may comprise one or more deformable or non-deformable clips or the like. In some embodiments, fasteners that are supplied separately from filter 1 and from filter-support layer 50 may be used. Any suitable fastener (e.g., chosen from clips, pins, clamps, bands and so on) may be used. Any combination of any suitable fastener or fasteners (whether supplied with filter 1, with filter-support layer 50, and/or supplied separately) may be used as desired.

It will be appreciated that in some embodiments (e.g., in which noncorrugated ends 5 and 5' of pleated filter 1 are wrapped around first and second ends of filter-support layer 50 and are fastened to the backside thereof), pleated filter 1 may not necessarily be directly attached or adhered to air-transmissive area 53 of filter-support layer 50 (or, to any portion of upstream face 55 of filter-support layer 50). The concept of pleated filter 1 being "installed on" an upstream face 55 of filter-support layer 50 thus does not necessarily require actual direct attachment of the filter to the upstream face. Moreover, in some embodiments the installation may not involve any direct "attachment" of filter 1 to filter-support layer 50 at all. For example, filter 1 may be held in place on the upstream face of filter-support layer 50 by the pressure of being sandwiched between filter cover 60 and filter-support layer 50. Or, ends of filter 1 may be wrapped around edges of filter-support layer 50 and held by pressure between the edges of filter-support layer 50, and surfaces of some other component of the HVAC system, so as to maintain filter 1 in the desired location relative to filter-support layer 50. All such configurations fall under the general category of installing filter 1 on the upstream face of a filter-support layer 50 of an HVAC system.

In some embodiments filter 1 may be supplied in a size appropriate for a particular filter-support layer. In other embodiments, it may be supplied in larger sizes and cut to fit by an end user. In some embodiments, pleated filters 1 (whether already sized for a particular use, or whether supplied as a roll from which individual pleated filters 1 are then separated) may be packaged together as a kit (e.g. along with instructions). It will be appreciated that in particular embodiments a pleated filter may be supplied in a "rolled-up" configuration with a relatively small radius of curvature. (An individual pleated filter may be supplied in this manner; or, a roll from which individual pleated filters may be separated may be supplied in this manner.) Any such pleated filter may be unrolled (conformed) to the desired extent (i.e., to match the curvature of a filter-support layer 50 on whose upstream face the filter is to be installed). Any such pleated filter falls within the herein-disclosed concept of a conformable pleated filter, even if the pleated filter is not necessarily ever completely unrolled to a nominally planar configuration in the course of installing the filter onto a filter-support layer.

LIST OF EXEMPLARY EMBODIMENTS

Embodiment 1 is a conformable, unframed, non-self-supporting pleated air filter, comprising: a conformable, unframed, non-self-supporting, pleated air filter media with an upstream face and a downstream face, wherein the conformable, unframed, non-self-supporting, pleated air filter media comprises a plurality of oppositely-facing pleats with a pleat direction and with a plurality of upstream pleat tips and upstream pleat valleys and downstream pleat tips and downstream pleat valleys, the pleated air filter media further comprising a plurality of bridging filaments on the downstream face of the pleated air filter media, wherein at least some of the bridging filaments of the plurality of bridging filaments are in discontinuous contact with the upstream face of the pleated air filter media and are bonded to at least some of the upstream pleat tips; or, are in discontinuous contact with the downstream face of the pleated air filter media and are bonded to at least some of the downstream pleat tips.

Embodiment 2 is the pleated air filter of embodiment 1 wherein at least some of the bridging filaments are at least generally parallel to each other and are oriented at least generally orthogonal to the pleat direction. Embodiment 3 is the pleated air filter of embodiment 2 wherein the bridging filaments are at least essentially parallel to each other and comprise a spacing between filaments of from about 4 mm to about 25 mm. Embodiment 4 is the pleated air filter of any of embodiments 1-3 wherein bridging filaments that are bonded to at least some of the upstream pleat tips or at least some of the downstream pleat tips, are bonded to the pleat tips by melt-bonds.

Embodiment 5 is the pleated air filter of any of embodiments 1-4 wherein at least some of the bridging filaments are in discontinuous contact with the upstream face of the pleated air filter media and are bonded to at least some of the upstream pleat tips, and wherein no bridging filaments are present on the downstream face of the pleated air filter media. Embodiment 6 is the pleated air filter of any of embodiments 1-4 wherein at least some of the bridging filaments are in discontinuous contact with the downstream face of the pleated air filter media and are bonded to at least some of the downstream pleat tips, and wherein no bridging filaments are present on the upstream face of the pleated air filter media. Embodiment 7 is the pleated air filter of any of embodiments 1-4 wherein the plurality of bridging filaments are provided in the form of a first set of bridging filaments at least some of which are in discontinuous contact with the downstream face of the pleated air filter media and are bonded to at least some of the downstream pleat tips; and, a second set of bridging filaments at least some of which are in discontinuous contact with the upstream face of the pleated air filter media and are bonded to at least some of the upstream pleat tips.

Embodiment 8 is the pleated air filter of any of embodiments 1-7 wherein at least some of the bridging filaments are provided as part of a pre-existing scrim that is bonded to at least some of the upstream pleat tips or to at least some of the downstream pleat tips. Embodiment 9 is the pleated air filter of any of embodiments 1-8 wherein the pleated filter media exhibits a pleat height in the range of from about 2 mm to about 12 mm. Embodiment 10 is the pleated air filter of any of embodiments 1-9 wherein the pleated filter media exhibits a pleat spacing in the range of from about 5 mm to about 20 mm. Embodiment 11 is the pleated air filter of any of embodiments 1-10 wherein the pleats are sinusoidal pleats in which the upstream pleat tips and the downstream pleat tips each exhibit an average radius of curvature of at least about 2 mm and in which none of the upstream pleat tips nor downstream pleat tips are score-pleated.

Embodiment 12 is the pleated air filter of any of embodiments 1-11 wherein the pleated air filter media is a compressible pleated air filter media. Embodiment 13 is the pleated air filter of any of embodiments 1-12 wherein the pleated air filter media comprises a nonwoven web comprising organic polymeric fibers at least some of which are electrostatically charged. Embodiment 14 is the pleated air filter of any of embodiments 1-13 wherein the air filter media exhibits a Taber Stiffness of less than 1.0 Taber Stiffness Units and a Gurley Stiffness of less than 100 mg.

Embodiment 15 is the pleated air filter of any of embodiments 1-14 wherein the pleated air filter is configured to be conformed to, and contacted with, an upstream face of a filter-support layer of an HVAC system. Embodiment 16 is the pleated air filter of any of embodiments 1-15 wherein the bridging filaments are comprised of an elastic material and wherein the pleated air filter is expandable from an unexpanded configuration in which the pleated air filter exhibits an unexpanded pleat spacing, to an expanded configuration in which the pleated air filter exhibits an expanded pleat spacing that is at least about 120% of the unexpanded pleat spacing. Embodiment 17 is a kit comprising a plurality of pleated air filters of any of embodiments 1-16 that are packaged together in the same package.

Embodiment 18 is an assembly for filtering air, the assembly comprising: an arcuate filter-support layer with an upstream face and a downstream face and with the pleated air filter of any of embodiments 1-16 installed on an upstream face of the arcuate filter-support layer, wherein the arcuate filter-support layer is a removable or non-removable component of an HVAC system.

Embodiment 19 is the assembly of embodiment 18 wherein the pleated air filter is in direct contact with the upstream face of the arcuate filter-support layer and wherein the pleated filter is attached to the arcuate filter-support layer. Embodiment 20 is the assembly of any of embodiments 18-19 wherein the assembly consists essentially of the arcuate filter-support layer with a single layer of the pleated air filter installed on the upstream face thereof. Embodiment 21 is the assembly of any of embodiments 18-20 further comprising a filter cover that is a removable or non-removable component of the HVAC system, wherein the filter cover is positioned on an upstream side of the pleated air filter and comprises through-openings therethrough.

Embodiment 22 is the assembly of embodiment 21 wherein the pleated air filter comprises first and second corrugated edges and wherein when the pleated air filter, the arcuate filter-support layer, and the filter cover, are all in place in the HVAC system, at least one of the first and second corrugated edges of the pleated air filter is an unoccluded corrugated edge. Embodiment 23 is the assembly of any of embodiments 18-22 wherein the arcuate filter-support layer comprises an air-transmissive area that is chosen from the group consisting of a screen, mesh, grid, and a perforated sheet. Embodiment 24 is the assembly of any of embodiments 18-23 wherein the pleated air filter is smaller in size than the arcuate filter-support layer, so that the arcuate filter-support layer comprises a bypass area in which moving air can pass through the arcuate filter-support layer without having passed through the pleated air filter, which bypass area exhibits a size ranging from about 5% to about 30% of the total air-transmissive area of the arcuate filter-support layer. Embodiment 25 is the assembly of any of embodiments 18-24 wherein the HVAC system is a mini-split HVAC system that is not a centralized HVAC system.

Embodiment 26 is a method of filtering air, the method comprising: positioning a single layer of the pleated air filter of any of embodiments 1-16 on an upstream side of an arcuate filter-support layer of an HVAC system; and, operating the HVAC system so that moving air is pulled through the single layer of the pleated air filter so as to filter the air pulled therethrough.

It will be apparent to those skilled in the art that the specific exemplary elements, structures, features, details, configurations, etc., that are disclosed herein can be modified and/or combined in numerous embodiments. All such variations and combinations are contemplated by the inventor as being within the bounds of the conceived invention, not merely those representative designs that were chosen to serve as exemplary illustrations. Thus, the scope of the present invention should not be limited to the specific illustrative structures described herein, but rather extends at least to the structures described by the language of the claims, and the equivalents of those structures. Any of the elements that are positively recited in this specification as alternatives may be explicitly included in the claims or excluded from the claims, in any combination as desired. Any of the elements or combinations of elements that are recited in this specification in open-ended language (e.g., comprise and derivatives thereof), are considered to additionally be recited in closed-ended language (e.g., consist and derivatives thereof) and in partially closed-ended language (e.g., consist essentially, and derivatives thereof). To the extent that there is any conflict or discrepancy between this specification as written and the disclosure in any document incorporated by reference herein, this specification as written will control.

What is claimed is:

1. A conformable, unframed pleated air filter, comprising:
    an unframed pleated air filter media with an upstream face and a downstream face,
    wherein the unframed pleated air filter media comprises a plurality of oppositely-facing pleats with a pleat direction and with a plurality of upstream pleat tips and upstream pleat valleys and downstream pleat tips and downstream pleat valleys, the unframed pleated air filter media further comprising a plurality of bridging filaments on at least one face of the unframed pleated air filter media,
    wherein at least some of the bridging filaments of the plurality of bridging filaments are in discontinuous contact with the upstream face of the unframed pleated air filter media and are bonded to at least some of the upstream pleat tips; or, are in discontinuous contact with the downstream face of the unframed pleated air filter media and are bonded to at least some of the downstream pleat tips;
    wherein the unframed pleated air filter is conformable at least between a first, nominally planar configuration and a second, conformed configuration, the second, conformed configuration being an arcuate configuration in which the unframed pleated air filter exhibits single curvature with a conforming axis that is orthogonal to a pleat direction of the unframed pleated air filter and with an average radius of curvature of less than 100 cm;
    and wherein the conformable, unframed pleated air filter is configured to be conformed to, and contacted with, an upstream face of an arcuate filter-support layer of an HVAC system, and to filter air that is pulled through the conformable, unframed pleated air filter when the HVAC system is operated.

2. The conformable, unframed pleated air filter of claim 1 wherein at least some of the bridging filaments are parallel to each other and are oriented orthogonal to the pleat direction.

3. The conformable, unframed pleated air filter of claim 2 wherein the bridging filaments comprise a spacing between bridging filaments of from 4 mm to 25 mm.

4. The conformable, unframed pleated air filter of claim 1 wherein at least some of the bridging filaments are in discontinuous contact with the upstream face of the unframed pleated air filter media and are bonded to at least some of the upstream pleat tips, and wherein no bridging filaments are present on the downstream face of the unframed pleated air filter media.

5. The conformable, unframed pleated air filter of claim 1 wherein at least some of the bridging filaments are in discontinuous contact with the downstream face of the unframed pleated air filter media and are bonded to at least some of the downstream pleat tips, and wherein no bridging filaments are present on the upstream face of the unframed pleated air filter media.

6. The conformable, unframed pleated air filter of claim 1 wherein the plurality of bridging filaments are provided in the form of a first set of bridging filaments at least some of which are in discontinuous contact with the downstream face of the unframed pleated air filter media and are bonded to at least some of the downstream pleat tips; and, a second set of bridging filaments at least some of which are in discontinuous contact with the upstream face of the unframed pleated air filter media and are bonded to at least some of the upstream pleat tips.

7. The conformable, unframed pleated air filter of claim 1 wherein at least some of the bridging filaments are provided as part of a pre-existing scrim that is bonded to at least some of the upstream pleat tips or to at least some of the downstream pleat tips.

8. The conformable, unframed pleated air filter of claim 1 wherein the pleats are sinusoidal pleats in which the upstream pleat tips and the downstream pleat tips each exhibit an average radius of curvature of at least 2 mm and in which none of the upstream pleat tips nor downstream pleat tips are score-pleated.

9. The conformable, unframed pleated air filter of claim 1 wherein the unframed pleated air filter media is compressible.

10. The conformable, unframed pleated air filter of claim 1 wherein the unframed pleated air filter media comprises a nonwoven web comprising organic polymeric fibers at least some of which are electrostatically charged.

11. The conformable, unframed pleated air filter of claim 1 wherein the bridging filaments are comprised of an elastic material and wherein the conformable, unframed pleated air filter is expandable from an unexpanded configuration in which the conformable, unframed pleated air filter exhibits an unexpanded pleat spacing, to an expanded configuration in which the conformable, unframed pleated air filter exhibits an expanded pleat spacing that is at least about 120% of the unexpanded pleat spacing.

12. The conformable, unframed pleated air filter of claim 1 wherein the conformable, unframed pleated air filter comprising the unframed pleated air filter media with a plurality of bridging filaments on at least one face of the unframed pleated air filter media, is reversibly and repeatably conformable between the first, nominally planar configuration and the second, arcuate configuration.

13. The conformable, unframed pleated air filter of claim 1 wherein the bridging filaments are organic polymeric filaments that are extruded onto, and melt-bonded to, pleat tips of the unframed pleated air filter media.

14. The conformable, unframed pleated air filter of claim 13 wherein the bridging filaments exhibit a generally round shape when viewed in cross-section, with an average diameter of at most 2 mm.

15. The conformable, unframed pleated air filter of claim 13 wherein at least ten bridging filaments are present and wherein the bridging filaments are all parallel to each other and are spaced from each other at an average spacing of at most 20 mm.

16. The conformable, unframed pleated air filter of claim 13 wherein the unframed pleated air filter media is comprised of nonwoven fibers and wherein the bridging filaments are made of material of the same composition as the nonwoven fibers of the unframed pleated air filter media.

17. A kit comprising a plurality of conformable, unframed pleated air filters of claim 1 that are packaged together in the same package.

18. An assembly for filtering air, the assembly comprising:
an arcuate filter-support layer with an upstream, convex face and a downstream, concave face and with the conformable, unframed pleated air filter of claim 1 installed on the upstream, convex face of the arcuate filter-support layer so that over an entirety of a downstream face of the conformable unframed pleated air filter, downstream pleat tips of the conformable unframed pleated air filter are in direct contact with the upstream, convex face of the arcuate filter-support layer, wherein the arcuate filter-support layer is a removable or non-removable component of an HVAC system.

19. The assembly of claim 18, with the proviso that the conformable, unframed pleated air filter is not attached to the arcuate filter-support layer of the HVAC system.

20. A method of filtering air, the method comprising:
positioning an unframed pleated air filter on an upstream side of an arcuate filter-support layer of an HVAC system and conforming the unframed pleated air filter to an upstream, convex face of the arcuate filter-support layer of the HVAC system so that over an entirety of a downstream face of the unframed pleated air filter, downstream pleat tips of the unframed pleated air filter are in direct contact with the upstream, convex face of the arcuate filter-support layer of the HVAC system;
and, operating the HVAC system so that moving air is pulled through the unframed pleated air filter so as to filter the air pulled therethrough;
wherein the unframed pleated air filter comprises a plurality of bridging filaments on at least one of a downstream face and an upstream face of the unframed pleated air filter, at least some bridging filaments of the plurality of bridging filaments being in discontinuous contact with the downstream face of the unframed pleated air filter media and being bonded to at least some of the downstream pleat tips; or, being in discontinuous contact with the upstream face of the unframed pleated air filter media and being bonded to at least some upstream pleat tips of the unframed pleated air filter.

* * * * *